June 7, 1966 H. F. RAYFIELD 3,254,855

MAGNETIC TAPE TRANSPORT

Filed June 15, 1964 3 Sheets-Sheet 1

INVENTOR.
HARRY F. RAYFIELD

BY Christie, Parker & Hale
ATTORNEYS.

June 7, 1966 H. F. RAYFIELD 3,254,855

MAGNETIC TAPE TRANSPORT

Filed June 15, 1964 3 Sheets-Sheet 2

INVENTOR.
HARRY F. RAYFIELD
BY
Christie, Parker & Hale
ATTORNEYS.

June 7, 1966 H. F. RAYFIELD 3,254,855

MAGNETIC TAPE TRANSPORT

Filed June 15, 1964 3 Sheets-Sheet 3

INVENTOR.
HARRY F. RAYFIELD
BY
Christie, Parker & Hale
ATTORNEYS.

United States Patent Office 3,254,855
Patented June 7, 1966

3,254,855
MAGNETIC TAPE TRANSPORT

Harry F. Rayfield, Arcadia, Calif., assignor to Burroughs Corporation, Detroit, Mich., a corporation of Michigan Filed June 15, 1964, Ser. No. 375,025
7 Claims. (Cl. 242—55.12)

This invention relates to magnetic tape transports and, more particularly, is concerned with an improved reel drive system for a digital tape transport.

Digital tape transports in which the tape must be started, stopped and reversed at high speed in the operational zone require some type of buffering arrangement between the operational zone and the take-up and supply reels. One well known type of buffering arrangement is a vacuum column which stores magnetic tape in the form of a loop, the loop being maintained under tension by evacuating the region below the loop. Various types of servo arrangements have been proposed for controlling the associated reel of tape which feeds tape into the vacuum column or withdraws tape from the vacuum column depending upon the direction of drive of tape through the operation zone. One well known tape transport of this type incorporates pressure sensing means positioned at two spaced points in the vacuum column. When the loop is between the two pressure sensing points in the vacuum column, a brake is engaged on the drive shaft of the associated reel. When the tape loop moves above one sensing point in the column, the reel is engaged by the clutch and driven in one direction. If the loop goes below the other sensing point in the vacuum column, the reel is engaged by a reverse drive clutch for rotational drive in the opposite direction.

Such known system has required a pressure sensitive transducer by means of which electrical switches are operated due to pressure changes occurring at the sensing points as the loop rises above or drops below the sensing point within the vacuum column. The vacuum sensing transducers operate switches which, in turn, control electromagnetic clutches to drive the reel in one direction or the other or to control an electromagnetic brake for stopping rotation of the reel.

The present invention is directed to a system in which changes in pressure along the vacuum column operate directly through mechanical linkage to control friction clutches to effect drive of the reel in either direction or to bring the reel to an abrupt stop. The present invention provides an improved system in that no electrical contacts are required which corrode and wear out due to switching of inductive loads such as provided by the electromagnetic clutches. Furthermore, the cost of electromagnetic clutches, which are more expensive than more conventional mechanical clutches, is avoided. In general, the reel drive system of the present invention is less complex and less expensive to build, more rugged and foolproof in its operation and is completely devoid of any electronic or relay switching logic for controlling the reel drive system.

For a complete understanding of the invention, reference should be made to the accompanying drawings wherein.

Figure 1:
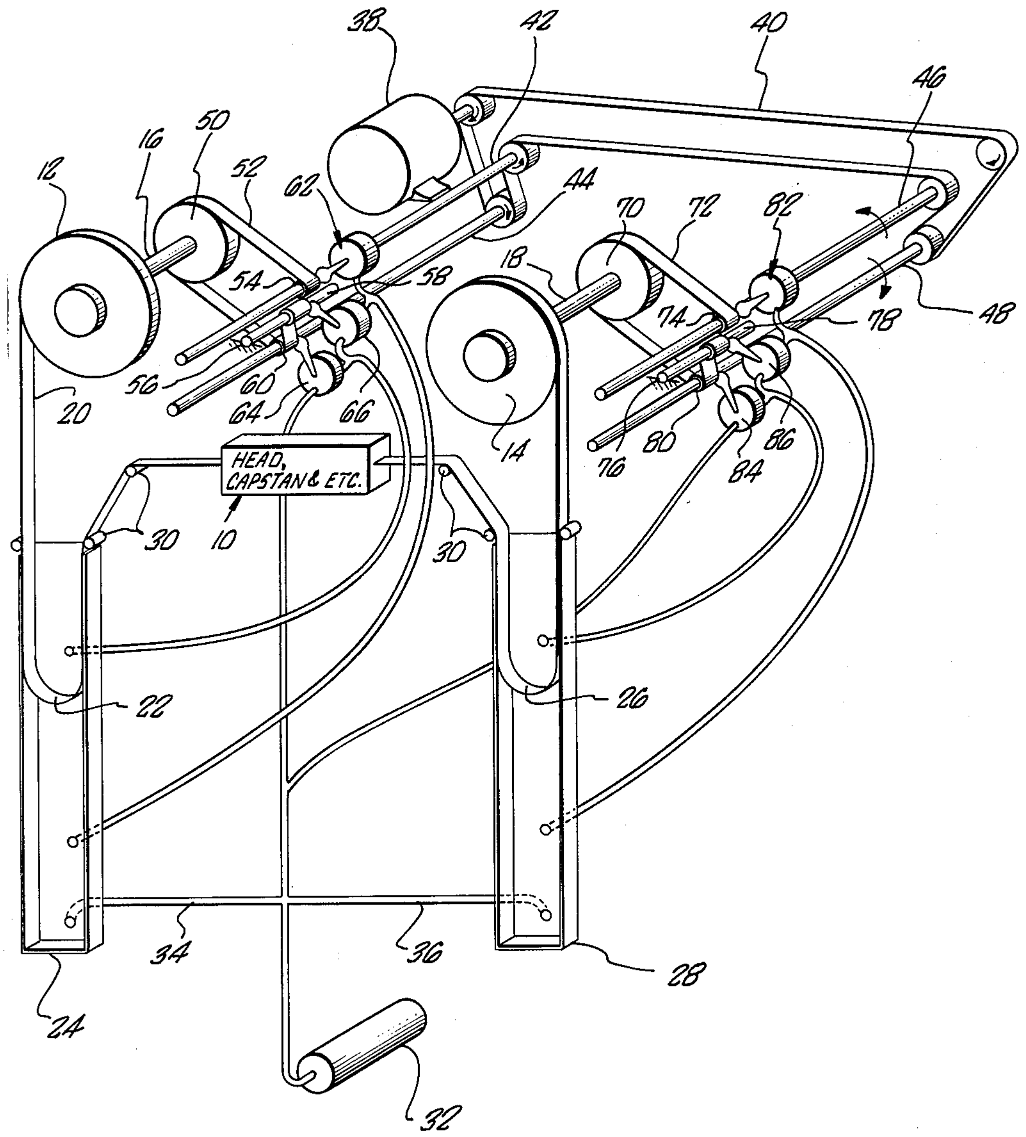
FIGURE 1 is a schematic view of one embodiment of a tape transport utilizing the principles of the present invention.

Referring to FIGURE 1 in detail, a tape transport system is shown for transporting tape in either direction at high speed through an operational zone indicated generally at 10. The operational zone typically incorporates magnetic heads for recording and playing back information on the tape and suitable capstan drive means for driving the tape in either direction at a predetermined speed through the operational zone. Details of the tape drive and the magnetic head arrangement are well known in the digital tape transport art and further description in the present application is not believed necessary. Tape is directed through the operational zone between a pair of reels 12 and 14, one of which operates as a supply reel and the other of which operates as a take-up reel depending upon the direction in which tape is being fed through the operational zone 10. The reel 12 is rotatably supported by a shaft 14 which is journalled in suitable bearing supports (not shown). Similarly, the reel 14 is rotatably supported by a shaft 18.

Magnetic tape, indicated at 20, is directed from the reel 12 to the reel 14 through the operational zone 10. A loop is formed in the tape 20, as indicated at 22. The loop 22 extends into the open end of a chute or vacuum column 24. A similar loop 26 between the operational zone 10 and the reel 14 extends into the open end of a second chute or vacuum column 28. Suitable guides are provided, as indicated at 30, for directing the tape between the operational zone 10 and the vacuum columns 24 and 28.

A vacuum pump 32 is connected through suitable ducts 34 and 36 to ports or openings in the bottom of the respective vacuum columns 24 and 28 for maintaining a vacuum in the region below the respective loops 22 and 26. The resulting differential pressure across the loops maintains tension in the tape as it passes between the respective reels and the operational zone.

The reels 12 and 14 are driven, in a manner hereinafter described, from an induction motor 38 which, by means of a belt 40, simultaneously drives four jack shafts 42, 44, 46 and 48. The belt is arranged to pass over pulleys on the motor shaft and on the jack shafts and is arranged, as shown in FIGURE 1, to drive the shafts 42 and 44 with opposite directions of rotation and similarly to drive the shafts 46 and 48 with opposite directions of rotation.

The reel 12 is driven selectively in one direction or the other from the jack shafts 42 and 44 by means of a belt drive including a pulley 50 on the shaft 16 which is engaged by a belt 52. The belt 52 passes over a pulley 54 journalled on the jack shaft 42, over a pulley 56 journalled on a fixed shaft 58 and then around a pulley 60 journalled on a jack shaft 44. A vacuum operated clutch mechanism, indicated generally at 62, engages the pulley 54 with the shaft 42 to impart rotation to the reel 12 in a first direction. A clutch 64 similarly engages the pulley 60 with the jack shaft 44 to impart rotation to the reel 12 in the opposite direction. A similar pneumatically operated clutch 66 engages the pulley 56 with the fixed shaft 58 to impart a braking action on the reel 12.

Similarly, a pulley 70 on the shaft 18 is driven by a belt 72 passing over a pulley 74 journalled on the jack shaft 46, around a pulley 76 journalled on a fixed shaft 78 and around a pulley 80 journalled on the jack shaft 48. A pneumatically operated clutch, indicated generally at 82, engages the pulley 74 with the jack shaft 46 to impart rotation to the reel 14 in one direction. A pneumatically-operated clutch, indicated generally at 84, engages the pulley 80 with the jack shaft 48 to impart rotation to the reel 14 in the opposite direction. A pneumatically operated clutch, indicated generally at 86, engages the pulley 76 with the fixed shaft 78 to impart a braking action on the reel 14.

Figure 3:
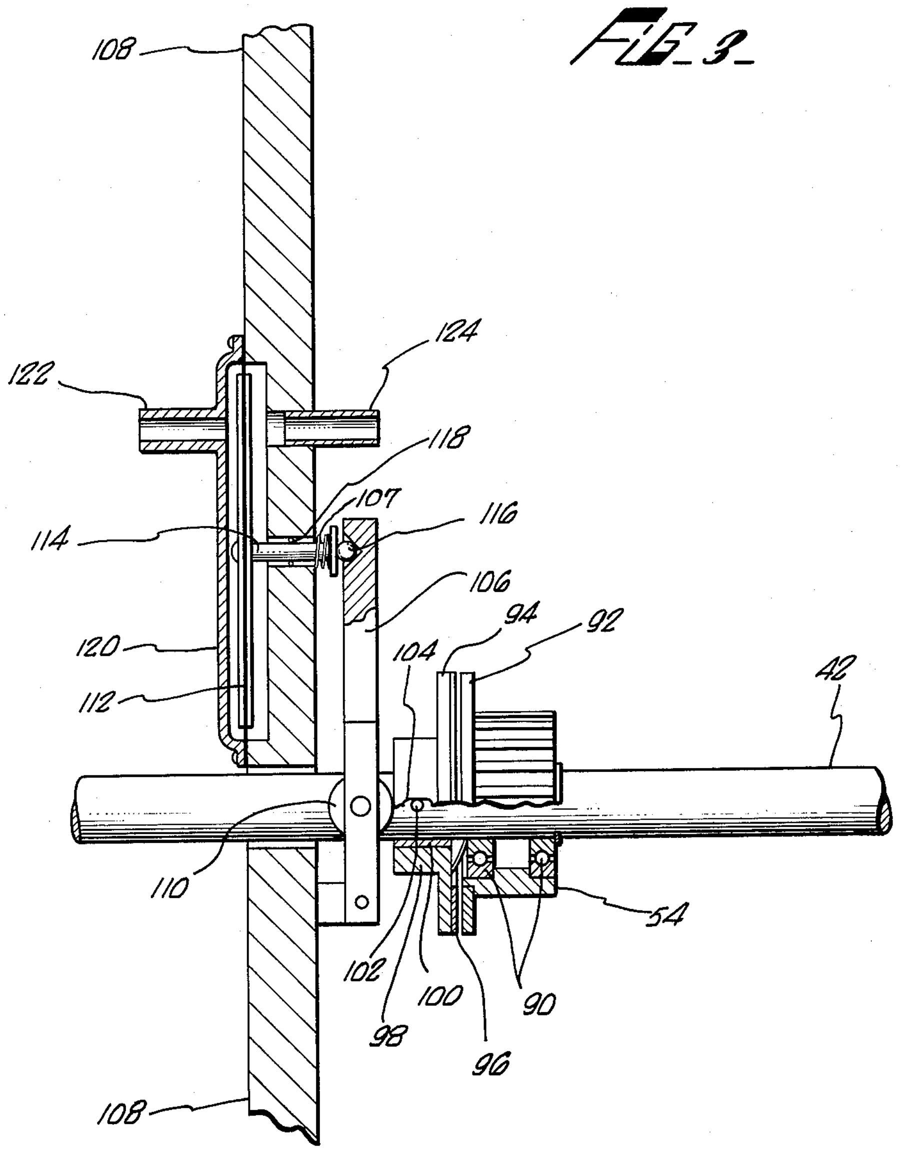
FIGURE 3 is a sectional view showing one embodiment of a vacuum operated clutch as used in the present invention.

Referring to FIGURE 3, there is shown in detail a pneumatically operated clutch assembly, indicated at 62. A similar clutch assembly may be used for the clutches 64, 66, 82, 84 and 86 of FIGURE 1. The pulley 54, engaged by the belt 52, is journalled on the jack shaft 42, as shown in FIGURE 3, by means of a pair of suitable ball bearings 90. A clutch face plate 92 is positioned adjacent to one edge of the pulley 54 to provide one clutch plate of a friction clutch. The other clutch plate is in the form of a flange 94 provided with an annular facing of friction clutch material 96. The flange 94 is integrally formed with a hub 98 which is slidably supported on the shaft 42 by means of a sleeve or bushing 100. A pin 102 passes through the shaft 42 and engages an elongated slot 104 in the hub 98. The pin 102 imparts rotation to the flange 94 and at the same time permits axial displacement of the flange 84 to bring it into engagement with the flange 92. A suitable spring 107 is positioned between the flanges 92 and 94 to normally urge them apart to disengage the clutch.

The clutch is operated by an actuating arm 106 which is pivotally supported at one end to a frame member, indicated generally at 108. The actuating arm carries a roller 110 which engages the hub 98 to urge the clutch friction material 96 into frictional engagement with the flange 92. Pneumatic operation of the actuating arm is provided by a diaphragm 112 which moves a pin 114, that in turn engages the actuating arm 106 through a ball and socket connection, indicated at 116. The pin 114 passes through an opening in the frame member 108, and an O-ring 118 provides a pressure seal between the pin and the surrounding hole. One side of the diaphragm is enclosed by a portion of the frame member 108 while the opposite side of the diaphragm 112 is enclosed by a cover 120. Openings or ports are provided to both sides of the diaphragm 112 as indicated at 122 and 124. Thus if air under pressure is admitted to port 122 under a pressure which is greater than air admitted to port 124, the diaphragm 112 is deflected by the differential pressure, urging the pin 114 into engagement with the actuating arm 106 thereby engaging the associated clutch.

Figure 2:
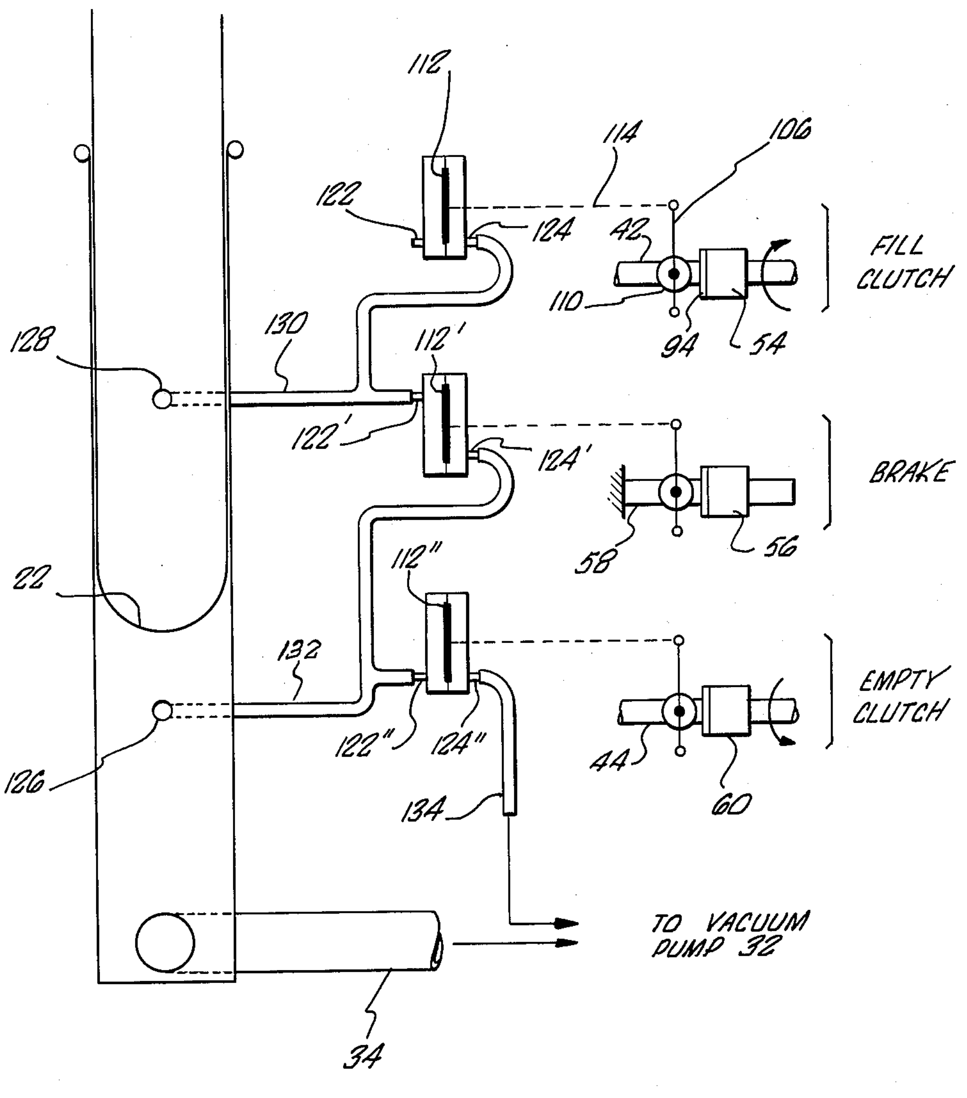
FIGURE 2 is a schematic diagram showing the details of the clutch and brake operating portions of the reel servo drive.

Referring to FIGURE 2, the manner in which the respective pneumatic reversing clutches and brake are operated is shown. The vacuum column 24 is provided with a lower sensing port 126 and an upper sensing port 128. The upper sensing port 128 is connected through a pneumatic line 130 to the port 124. Thus when the tape loop 22 moves above the upper sensing port 128, the right hand side of the diaphragm 112 is subjected to the vacuum produced by the pump 32 in the lower end of the vacuum column 24 by the pipe 34. The port 122 is open to ambient pressure. Thus a differential pressure is exerted on the diaphragm 112 urging the diaphargm to the right and engaging the clutch in the manner described above in connection with FIGURE 3, so that the pulley 54 is driven from the shaft 42. Thus rotation in one direction is provided for the associated reel 12.

The upper sensing port 128 is also connected through the pneumatic line 130 to one side of a similar clutch actuating diaphragm 112′ through an associated port 122′. At the same time, the lower sensing port 126 is connected through a line 132 to a port 124′ communicating with the opposite side of the diaphragm 112′. Thus with the table loop 22 in the position shown in FIGURE 2, the port 122′ is subject to ambient air pressure, while the port 124′ is subject to the reduced pressure of the lower end of the vacuum column 24. As a result, the diaphragm 112 is urged to the left actuating the associated clutch which acts as a brake in preventing rotation of the pulley 56.

The line 132 also connects to a port 122″ associated with a third diaphragm 112″. A similar port 124″ on the opposite side of the diaphragm 112″ is connected by a line 134 back to the vacuum pump 32. Thus when the loop 122 of the tape moves below the lower sensing port 126, the left hand side of the diaphragm 112″ is opened to ambient pressure, causing the diaphragm 112″ to be deflected to the right to engage the associated clutch and to produce rotation of the pully 60 from the shaft 44.

From the above description, it will be recognized that an entirely pneumatically actuated mechanical servo arrangement is provided for controlling the tape reels in response to changes in position of the tape loop within the associated vacuum columns. If the tape loop is between the two sensing points, a brake is applied stopping rotation of the reel. If tape is withdrawn from the column by the drive means in the operational zone, when the tape loop becomes short enough to move above the upper sensing port, a clutch is engaged to drive the reel from the motor 38 in a direction to feed additional tape into the vacuum column to lengthen the tape loop. On the other hand, if tape is being fed to the vacuum column through the operational zone causing the tape loop to become longer, the tape loop 22 will drop below the lower sensing port, causing the reel 12 to be driven in the other direction from the motor 38 to withdraw tape from the associated vacuum column.

What is cleaimed is:

1. In a tape transport in which tape is transported beween a reel and an operational zone, apparatus for controlling the reel with changes in speed and direction of the tape through the operational zone, said apparatus comprising a hollow chute open at one end and adapted to receive a loop of the tape, the chute being positioned along the tape intermediate the reel and the operational zone, means for guiding a portion of the tape into and out of the open end of the chute, means for evacuating the opposite end of the chute from said open end, whereby a differential pressure is maintained on the loop of tape in the chute, means including a first clutch for driving the reel in one direction when the clutch is engaged, means including a second clutch for driving the reel in the opposite direction when the clutch is engaged, brake mean coupled to the reel to stop rotation of the reel when the brake means is engaged, means including a first diaphragm mechanically linked to the first clutch for engaging the first clutch in response to a differential pressure on the first diaphragm, means including a second diaphragm mechanically linked to the second clutch for engaging the second clutch in response to a differential pressure on the second diaphragm, means including a third diaphragm mechanically linked to the break means for engaging the brake means in response to a differential pressure on the third diaphragm, means pneumatically connecting one side of the first diaphragm and one side of the third diaphragm to the interior of the chute at a first point, means pneumatically connecting the outer side of the first diaphragm to the evacuating means, and means pneumatically connecting one side of the second diaphragm and the other side of the third diaphragm to the interior of the chute at a second point.

2. In a tape transport in which tape is transported between a reel and an operational zone, apparatus for controlling the reel with changes in speed and direction of the tape through the operational zone, said apparatus comprising a hollow chute open at one end and adapted to receive a loop of the tape, the chute being positioned along the tape intermediate the reel and the operational zone, means for guiding a portion of the tape into and out of the open end of the chute, means for evacuating the opposite end of the chute from said open end, whereby a differential pressure is maintained on the loop of tape in the chute, means including a first clutch for driving the reel in one direction when the clutch is engaged, means including a second clutch for driving the reel in the opposite direction when the clutch is engaged, brake means coupled to the reel to stop rotation of the reel when the brake means is engaged, means including a first diaphragm for engaging the first clutch in response to a differential pressure on the first diaphragm, means including a second diaphragm for engaging the second clutch in response to a differential pressure on the second diaphragm, means including a third diaphragm for engaging the brake means in response to a differential pressure on the third diaphragm, means pneumatically connecting one side of the first diaphragm and one side of the third diaphragm to the interior of the chute at a first point, means pneumatically connecting the other side of the first diaphragm to the evacuating means, and means pneumatically connecting one side of the second diaphragm and the other side of the third diaphragm to the interior of the chute at a second point.

3. In a tape transport in which tape is transported between a reel and an operational zone, apparatus for controlling the reel with changes in speed and direction of the tape through the operational zone, said apparatus comprising a hollow chute open at one end and adapted to receive a loop of the tape, the chute being positioned along the tape intermediate the reel and the operational zone, means for guiding a portion of the tape into and out of the open end of the chute, means for evacuating the opposite end of the chute from said open end, whereby a differential pressure is maintained on the loop of tape in the chute, first drive means for driving the reel in one direction when engaged, second drive means for driving the reel in the opposite direction when engaged, brake means coupled to the reel to stop rotation of the reel when the brake means is engaged, means including a first diaphragm for engaging the first drive means in response to a differential pressure on the first diaphragm, means including a second diaphragm for engaging the second drive means in response to a differential pressure on the second diaphragm, means including a third diaphragm for engaging the brake means in response to a differential pressure on the third diaphragm, means pneumatically connecting one side of the first diaphragm and one side of the third diaphragm to the interior of the chute at a first point, means pneumatically connecting the other side of the first diaphragm to the evacuating means, and means pneumatically connecting one side of the second diaphragm and the other side of the third diaphragm to the interior of the chute at a second point.

4. In a tape transport in which tape is transported between a reel and an operational zone, apparatus for controlling the reel with changes in speed and direction of the tape through the operational zone, said apparatus comprising a hollow chute at one end and adapted to receive a loop of the tape, the chute being positioned along the tape intermediate the reel and the operational zone, means for guiding a portion of the tape into and out of the open end of the chute, means for evacuating the opposite end of the chute from said open end, whereby a differential pressure is maintained on the loop of tape in the chute, means including a first clutch for driving the reel in one direction when the clutch is engaged, means including a second clutch for driving the reel in the opposite direction when the clutch is engaged, brake means coupled to the reel to stop rotation of the reel when the brake means is engaged, means mechanically linked to the first clutch for engaging the first clutch in response to an applied differential fluid pressure, means mechanically linked to the second clutch for engaging the second clutch in response to an applied differential fluid pressure, means mechanically linked to the brake means for engaging the brake means in response to an applied differential fluid pressure, means pneumatically connecting the means for engaging the first clutch and the means for engaging the brake means to the interior of the chute at a first point, means pneumatically connecting the means for engaging the first drive means to the evacuating means, and means pneumatically connecting the means for engaging the second clutch and the means for engaging the brake means to the interior of the chute at a second point.

5. In a tape transport in which tape is transported between a reel and an operational zone, apparatus for controlling the reel with changes in speed and direction of the tape through the operational zone, said apparatus comprising a hollow chute open at one end and adapted to receive a loop of the tape, the chute being positioned along the tape intermediate the reel and the operational zone, means for guiding a portion of the tape into and out of the open end of the chute, means for evacuating the opposite end of the chute from said open end, whereby a differential pressure is maintained on the loop of tape in the chute, means including a first clutch for driving the reel in one direction when the clutch is engaged, means including a second clutch for driving the reel in the opposite direction when the clutch is engaged, brake means coupled to the reel to stop rotation of the reel when the brake means is engaged, means for engaging the first clutch in response to an applied differential fluid pressure, means for engaging the second clutch in response to an applied differential fluid pressure, means for engaging the brake means in response to an applied differential fluid pressure, means pneumatically connecting the means for engaging the first clutch and the means for engaging the brake means to the interior of the chute at a first point, means pneumatically connecting the means for engaging the first drive means to the evacuating means, and means pneumatically connecting the means for engaging the second clutch and the means for engaging the brake means to the interior of the chute at a second point.

6. In a tape transport in which tape is transported between a reel and an operational zone, apparatus for controlling the reel with changes in speed and direction of the tape through the operational zone, said apparatus comprising a hollow chute open at one end and adapted to receive a loop of the tape, the chute being positioned along the tape intermediate the reel and the operational zone, means for guiding a portion of the tape into and out of the open end of the chute, means for evacuating the opposite end of the chute from said open end, whereby a differential pressure is maintained on the loop of tape in the chute, first drive means for driving the reel in one direction when engaged, second drive means for driving the reel in the opposite direction when engaged, brake means coupled to the reel to stop rotation of the reel when the brake means is engaged, means for engaging the first drive means in response to a differential pressure, means for engaging the second drive means in response to a differential pressure, means for engaging the brake means in response to a differential pressure, means pneumatically connecting the means for engaging the first drive means and the means for engaging the brake means to the interior of the chute at a first point, means pneumatically connecting the means for engaging the first drive means to the evacuating means, and means pneumatically connecting the means for engaging the second drive means and the means for engaging the brake means to the interior of the chute at a second point.

7. In a tape transport system having a reel, drive means engaging the tape and a vacuum column positioned between the drive means and the reel for forming a loop in the tape, drive means for the reel comprising means including a first clutch for driving the reel in one direction, means including a second clutch for driving the reel in the opposite direction, a brake connected to the reel, means including a first diaphragm connected to the first clutch for operating the first clutch, means including a second diaphragm connected to the second clutch for operating the second clutch, means including a third diaphragm connected to the brake for operating the brake, vacuum pump means connected to one end of the vacuum column for evacuating the space below the loop, fluid coupling means connecting one side of the first diaphragm to the vacuum pump means, fluid coupling means connecting the other side of the first diaphragm to the vacuum column at a first point, fluid coupling means connecting one side of the second diaphragm to the vacuum column at a second point, the other side of the second diaphragm being at ambient pressure, fluid coupling means connecting one side of the third diaphragm to the first point in the vacuum column, and fluid coupling means connecting the other side of the third diaphragm to the second point in the vacuum column.

References Cited by the Examiner

UNITED STATES PATENTS

| | | | |
|---|---|---|---|
| 2,990,127 | 6/1961 | Cannings | 242—55.12 |
| 3,057,569 | 10/1962 | Weidenhammer | 242—55.12 |

MERVIN STEIN, *Primary Examiner.*

L. D. CHRISTIAN, *Assistant Examiner.*